United States Patent
Kurokawa et al.

(10) Patent No.: US 9,395,244 B2
(45) Date of Patent: Jul. 19, 2016

(54) SPECTRUM RECONSTRUCTION METHOD FOR MINIATURE SPECTROMETERS

(75) Inventors: Umpei Kurokawa, Pittsburgh, PA (US); Cheng-Chun Chang, New Taipei (TW); Byung Ii Choi, Pittsburgh, PA (US)

(73) Assignee: NANOLAMBDA, INC., Pittsburgh, PA (US)

( * ) Notice: Subject to any disclaimer, the term of this patent is extended or adjusted under 35 U.S.C. 154(b) by 442 days.

(21) Appl. No.: 13/825,611

(22) PCT Filed: Sep. 22, 2011

(86) PCT No.: PCT/US2011/052765
§ 371 (c)(1),
(2), (4) Date: Oct. 10, 2013

(87) PCT Pub. No.: WO2012/040466
PCT Pub. Date: Mar. 29, 2012

(65) Prior Publication Data
US 2014/0022544 A1    Jan. 23, 2014

Related U.S. Application Data

(60) Provisional application No. 61/385,789, filed on Sep. 23, 2010.

(51) Int. Cl.
*G01J 3/12* (2006.01)
*G01J 3/28* (2006.01)

(52) U.S. Cl.
CPC .... *G01J 3/12* (2013.01); *G01J 3/28* (2013.01); *G01J 3/2823* (2013.01)

(58) Field of Classification Search
CPC .............. G01J 3/12; G01J 3/28; G01J 3/2823
See application file for complete search history.

(56) References Cited

U.S. PATENT DOCUMENTS

| 5,245,406 A | 9/1993 | Masutani | |
|---|---|---|---|
| 7,084,974 B1 * | 8/2006 | Barwicz et al. | 356/328 |
| 2006/0274308 A1 * | 12/2006 | Brady | G01J 3/02 356/326 |
| 2007/0049809 A1 | 3/2007 | Bechtel et al. | |
| 2007/0171424 A1 | 7/2007 | Te Kolste et al. | |
| 2008/0144001 A1 * | 6/2008 | Heeg et al. | 356/326 |
| 2009/0033913 A1 * | 2/2009 | Mott | G01R 29/02 356/51 |
| 2011/0026029 A1 * | 2/2011 | Iwasaki | G01J 3/02 356/417 |

FOREIGN PATENT DOCUMENTS

| EP | 2112498 A1 | 10/2009 |
|---|---|---|
| WO | 01-65219 A1 | 9/2001 |

OTHER PUBLICATIONS

International Preliminary Report on Patentability issued in PCT Application No. PCT/US2011/052765, mailed on Apr. 4, 2013.
International Search Report & Written Opinion issued in PCT Application No. PCT/US2011/052765, mailed on Apr. 27, 2012.

* cited by examiner

*Primary Examiner* — Michael A Lyons
*Assistant Examiner* — Dominic J Bologna
(74) *Attorney, Agent, or Firm* — The Marbury Law Group PLLC

(57) ABSTRACT

Miniature spectrometers produce low resolution spectral data due to their size limitations. A method for processing these spectral data is proposed. The spectral data from a low resolution spectrometer is enhanced to a higher resolution, or processed to be in the wavelength domain. This process is called spectrum reconstruction, and can be used in low cost and miniature spectrometers with limited spectral resolution. The proposed method is noise robust, adapts to input spectrum, and can be used across many types of spectrometric devices without any manual adjustment of parameters.

19 Claims, 9 Drawing Sheets

SUMMARY OF THE ESTIMATION ERROR $e = \|\mathbf{x}_{true} - \hat{\mathbf{x}}\|_2^2$ AMONG ALL TESTED METHODS

| | METHOD | MEAN ERROR | ERROR FOR NARROW BAND SPECTRUM | ERROR FOR BROAD BAND SPECTRUM |
|---|---|---|---|---|
| NNLS | 1. UNREGULARIZED | 26.54 | 5.20 | 47.88 |
| | 2. TIKHONOV ADAPTIVE L CURVE | 5.87 | 4.88 | 6.85 |
| | 3. TIKHONOV ADAPTIVE GCV | 7.73 | 3.66 | 11.79 |
| | 4. OPT. FIXED TIKHONOV PARAM. | 7.08 | 4.55 | 9.61 |
| | 5. OPT. TIKHONOV PARAMETERS | 4.74 | 3.12 | 6.36 |

FIG. 5

| | | | MEAN ERROR | ERROR FOR NARROW BAND SPECTRUM | ERROR FOR BROAD BAND SPECTRUM |
|---|---|---|---|---|---|
| ZEROTH ORDER TIKHONOV REGULARIZATION | PSEUDO-INVERSE | 1. UNREGULARIZED | 198.19 | 136.08 | 260.31 |
| | | 2. TIKHONOV ADAPTIVE L CURVE | 9.63 | 9.84 | 9.41 |
| | | 3. TIKHONOV ADAPTIVE GCV | 19.88 | 24.76 | 15.00 |
| | | 4. OPT. FIXED TIKHONOV PARAM. | 11.00 | 13.78 | 8.23 |
| | | 5. OPT. TIKHONOV PARAMETERS | 7.80 | 8.83 | 6.76 |
| | NNLS | 1. UNREGULARIZED | 26.54 | 5.20 | 47.88 |
| | | 2. TIKHONOV ADAPTIVE L CURVE | 5.87 | 4.88 | 6.85 |
| | | 3. TIKHONOV ADAPTIVE GCV | 7.73 | 3.66 | 11.79 |
| | | 4. OPT. FIXED TIKHONOV PARAM. | 7.08 | 4.55 | 9.61 |
| | | 5. OPT. TIKHONOV PARAMETERS | 4.74 | 3.12 | 6.36 |
| FIRST ORDER TIKHONOV REGULARIZATION | PSEUDO-INVERSE | 1. UNREGULARIZED | 198.19 | 136.08 | 260.31 |
| | | 2. TIKHONOV ADAPTIVE L CURVE | 19.12 | 14.80 | 23.43 |
| | | 3. TIKHONOV ADAPTIVE GCV | 16.43 | 24.66 | 8.19 |
| | | 4. OPT. FIXED TIKHONOV PARAM. | 11.80 | 14.53 | 9.07 |
| | | 5. OPT. TIKHONOV PARAMETERS | 9.04 | 11.19 | 6.89 |
| | NNLS | 1. UNREGULARIZED | 26.54 | 5.20 | 47.88 |
| | | 2. TIKHONOV ADAPTIVE L CURVE | 14.47 | 4.05 | 24.90 |
| | | 3. TIKHONOV ADAPTIVE GCV | 6.71 | 4.04 | 9.38 |
| | | 4. OPT. FIXED TIKHONOV PARAM. | 8.82 | 5.28 | 12.35 |
| | | 5. OPT. TIKHONOV PARAMETERS | 6.22 | 3.53 | 8.91 |
| SECOND ORDER TIKHONOV REGULARIZATION | PSEUDO-INVERSE | 1. UNREGULARIZED | 198.19 | 136.08 | 260.31 |
| | | 2. TIKHONOV ADAPTIVE L CURVE | 28.37 | 20.15 | 36.59 |
| | | 3. TIKHONOV ADAPTIVE GCV | 17.41 | 26.09 | 8.73 |
| | | 4. OPT. FIXED TIKHONOV PARAM. | 12.65 | 14.95 | 10.35 |
| | | 5. OPT. TIKHONOV PARAMETERS | 10.21 | 12.40 | 8.01 |
| | NNLS | 1. UNREGULARIZED | 26.54 | 5.20 | 47.88 |
| | | 2. TIKHONOV ADAPTIVE L CURVE | 17.95 | 3.95 | 31.94 |
| | | 3. TIKHONOV ADAPTIVE GCV | 8.87 | 4.22 | 13.53 |
| | | 4. OPT. FIXED TIKHONOV PARAM. | 11.87 | 5.09 | 18.65 |
| | | 5. OPT. TIKHONOV PARAMETERS | 7.84 | 3.27 | 12.41 |

FIG. 7

SPECTRUM RECONSTRUCTION METHOD FOR MINIATURE SPECTROMETERS

CROSS-REFERENCE TO RELATED APPLICATIONS

This application claims the benefit of priority to U.S. Provisional Patent Application Ser. No. 61/385,789 filed Sep. 23, 2010 which is hereby incorporated herein by reference in its entirety.

BACKGROUND

Traditional spectrometers often use diffractive optics or interferometic devices to resolve the power of the input spectrum at specified wavelengths. The diffractive optical elements or the interferometic devices act as sets of wavelength-specific filters with center frequencies allocated across the wavelengths of interest. Modern high performance spectrometers boast an impressive resolution as high as 0.001 nm in the visible light region. However, most traditional spectrometers are designed for lab use. Their size and cost limits their application, and hence miniature spectrometers have been developed to fill this need. Miniature spectrometers can be manufactured cost effectively by means of micro-electro-mechanical systems (MEMS), micro-optic-electromechanical systems, and/or silicon-bulk techniques.

Common types of miniature spectrometers include grating based, Fabry-Perot based, and Fourier transform based spectrometers. A common purpose among these different types is to make possible a miniature filtering mechanism for separating energy with specific wavelength of interest emitting from an object, such as an object spectrum illustrated in FIG. 1. However, regardless of these different approaches, it is difficult to build high resolution, high quality wavelength-specific filters into miniature spectrometers because of the short optical path (inherent to a miniature spectrometer), the optical properties of silicon IC process compatible materials, and the lack of adequate optical signal conditioning. Consequently, the transmittance properties of the wavelength-specific filters may not be of single-tone, may have large ripples on pass and stop bands, and may have poor stop band attenuation. In these cases, the wavelength-specific filters are highly correlated with each other. From here on, these spectral filters will be called low resolution filters.

The results derived from low resolution filters no longer resemble the spectrum of the input in the wavelength domain. Specifically speaking, when low resolution filters are applied, the output is in terms of a vector space defined by the filters. In other words, the raw output of each spectral filter does not necessarily correspond to a specific wavelength as in traditional spectrometers. For many applications, it is useful and often necessary to view the output in the wavelength domain so as to identify and/or compare the spectral properties of measurement objects.

SUMMARY OF THE INVENTION

Various embodiments include spectrum reconstruction processes for converting the raw data from filter-domain into wavelength-domain using methods of regularization, regularization parameter selection, and dimension reduction. Various embodiment methods are noise robust, and applicable to any miniature spectrometer with low resolution spectral filters. An embodiment process flow diagram is shown in FIG. 3. The regularized solution may be calculated using the regularization parameter and dimension reduced filter transmission. The regularization parameter may be chosen by the regularization parameter selection method, and the dimension reduced filter transmission may be given by the dimension reduction method.

The L-curve criterion and Generalized Cross Validation (GCV) criterion for adaptively selecting the regularization parameter are disclosed. By using the regularization parameter selection methods, various embodiment methods may be used across different spectrometric devices of different filtering characteristics without any manual calibration of parameters. Manual calibration can be a time consuming task, and impractical if there are many devices that need to be calibrated. Regularization parameter selection also reduces the error in the estimation by adaptively changing the regularization parameter based on the target input spectrum.

The Tikhonov regularization or truncated singular value decomposition (TSVD) may be used to obtain the regularized solution. Moreover, additional improvement may be obtained by exploiting non-negative constraints on the reconstructed spectrum. Non-negative least square (NNLS) method can be used for this method.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 5 is a summarized table of experimental data obtained from an example application.

FIG. 7 is a full table of experimental data obtained from an example application.

DETAILED DESCRIPTION OF THE PREFERRED EMBODIMENTS

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Linear Model

Figure 2:
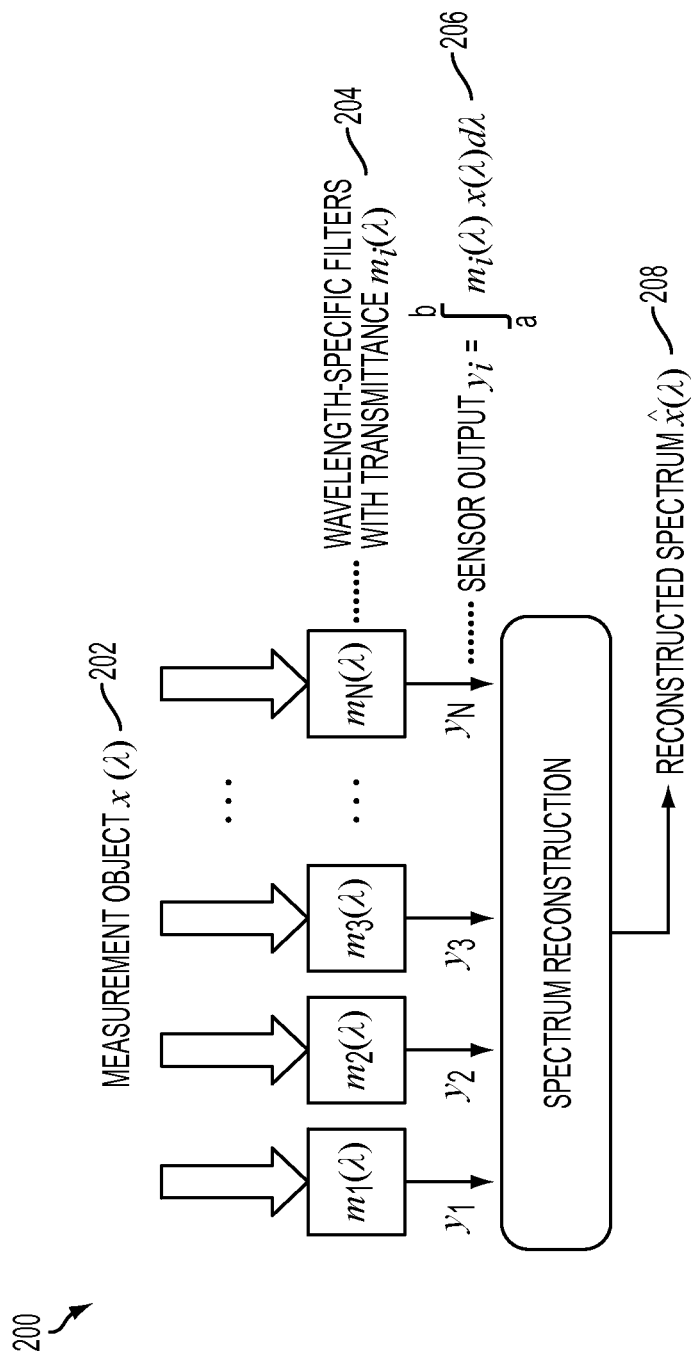
FIG. 2 is a block diagram of a spectrometer.

In this section, the linear model used in various embodiment spectrum reconstruction methods is explained. FIG. 2 illustrates a block diagram of a spectrometer 200. Let $x(\lambda)$ 202 denote an object spectrum, and $m_i(\lambda)$ 204 denote the transmittance of the $i^{th}$ filter. Consider the output signal via the $i^{th}$ filter is associated by $y_i = \int_a^b m_i(\lambda)x(\lambda)d\lambda$ 206 in which the multiplicative term $m_i(\lambda)x(\lambda)$ is assumed to have nonzero component only within the interval [a, b]. We wish to solve for the unknown function $x(\lambda)$ 202 from a number of observations of $y_i$, i=1, 2, . . . , N 206. Various embodiments include methods and devices for generating a reconstructed spectrum 208 based on these observations 206.

To obtain numerical solutions using linear algebra methods, the system model $y_i = \int_a^b m_i(\lambda)x(\lambda)d\lambda$ can be discretized into R sections and approximated by $$\sum_{j=1}^{R} m_i(\lambda_j)x(\lambda_j)\Delta_x,$$

where $\Delta_x=(b-a)/R$ and $\lambda_j=a+\Delta_x/2+(j-1)\Delta_x$. To tackle the inverse problem, we model the problem of spectrum reconstruction as a system of linear equations. The discretized model in matrix form is then associated by $$Mx=y \quad \text{(Eq. 1)}$$

where $[M]_{i,j}=m_i(\lambda_j)$, $[x]_j=x(\lambda_j)$, and $[y]_i=y_i$ for i=1, 2, . . . , N; j=1, 2, . . . , R. In other words, Y contains the filter output data, and x is the spectrum we are trying to estimate. $M_{N,R}$ contains the filter transmittance in its rows. N refers to the number of filters and R refers to the sampling resolution of the filter transmittance as well as the resolution of spectrum to be estimated.

Dimension Reduction

Figure 1:
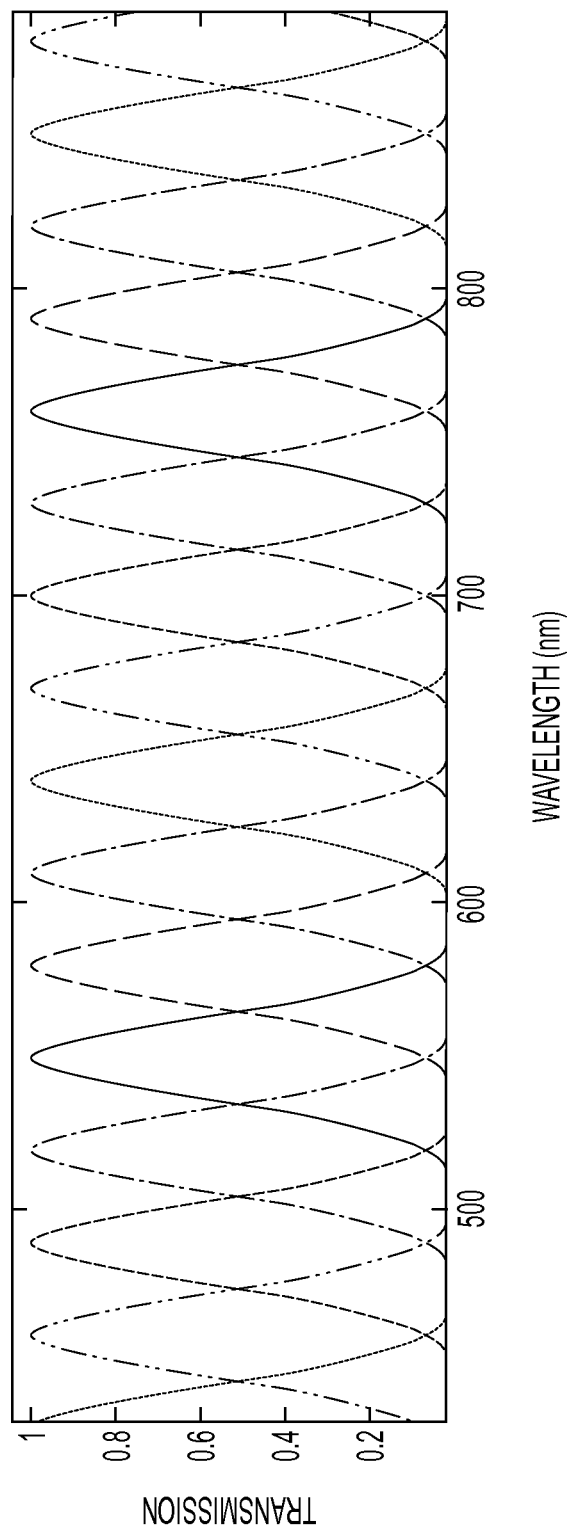
FIG. 1 is a spectral response function of high resolution spectral filters.

The system of equations described above will be undetermined if N<R. To prevent this, a transformation matrix S may be used to reduce the number of unknowns in the system of linear equations. Let $$x=S\bar{x} \quad \text{(Eq. 2)}$$

where $[S]_{j,k}=s_k(\lambda_j)$, j=1, 2, . . . , R and k=1, 2, . . . , D. In this formulation, the estimated spectrum x becomes a linear combination of the basis vectors $s_k$ in the D dimension space. S may be a collection of any orthogonal functions and the appropriate choice of $s_k$ will depend on applications as well the characteristic of the filters in use. For example, by making $s_k$ a set of Gaussian functions with evenly spaced means and a set of pre-determined variances, as illustrated in FIG. 1, the system model in matrix form becomes:

$$\bar{M}\bar{x}=y \quad \text{(Eq. 3)}$$

where $\bar{M}=MS$.

Regularized Solution Calculation

Some form of regularization may be necessary for the spectrum reconstruction problem if the problem is ill conditioned. Since the low resolution filters are correlated to each other, the condition number of matrix M and MS is usually very high. The solution of the least squares problem becomes severely affected by errors in either M or y. Here we start with the system equation Mx=y for notation convenience. It should be noticed that the discussed method can be applied to Eq. 3 straightforwardly.

If we assume there exists modeling error in M and the data y is contaminated by experimental measurement error and/or system noise, then there is no point to fit x exactly into the system model. It becomes reasonable that there could be many candidate solutions that adequately fit the system model in the sense that $\|Mx-y\|_2$ is small enough. In this section, we introduce two regularization techniques: Tikhonov regularization and the truncated singular value decomposition.

Truncated singular value decomposition is based on the singular value decomposition (SVD) of a matrix which is given by $$M=U\Sigma V^T \quad \text{(Eq. 4)}$$

$$\Sigma=\text{diag}(\sigma 1, \sigma 2, \ldots, \sigma n) \text{ where } \sigma 1 > \sigma 2 > \ldots > \sigma n$$

U and V are orthogonal matrices, and $\Sigma$ is a diagonal matrix containing singular values in its diagonals. The pseudo inverse is commonly calculated from the SVD as $$V\Sigma^{-1}U^T \quad \text{(Eq. 5)}$$

Instead, with the truncated SVD, the pseudo inverse is calculated as below, where the singular values in $\Sigma$ after the kth singular value is set to zero.

$$U\Sigma_k^{-1}V^T \quad \text{(Eq. 6)}$$

$$\Sigma_k=\text{diag}(\sigma 1, \sigma 2, \ldots, \sigma k, 0, \ldots, 0)$$

Tikhonov regularizations considers the least square problem as a damped least square problem: min $\|Mx-y\|_2 + \alpha^2\|Lx\|_2$, where $\alpha$ is a regularization parameter. We note that the matrix L in the forms of $$L = \begin{bmatrix} 1 & & & \\ & 1 & & \\ & & \ddots & \\ & & & 1 \end{bmatrix}, \quad \text{(Eq. 7)}$$

$$L = \begin{bmatrix} 1 & -1 & & \\ & 1 & -1 & \\ & & \ddots & \\ & & & 1 \end{bmatrix},$$

and $$L = \begin{bmatrix} 2 & -1 & & \\ -1 & 2 & -1 & \\ & & \ddots & \\ & & -1 & 2 \end{bmatrix}$$

are, respectively, for zeroth-order, first-order, and second-order regularizations. For zeroth order regularization, it minimizes the norm of the solution. Intuitively, zeroth order regularization tries to remove nonzero features for the regularized solution. For first- or second-order regularizations, smoothness features in the data x are preserved. The damped least square problem can be formulated as the least square problem $$\min \left\| \begin{bmatrix} M \\ \alpha L \end{bmatrix} x - \begin{bmatrix} y \\ 0 \end{bmatrix} \right\|_2^2 \quad \text{(Eq. 8)}$$

The solution of x can be solved straightforwardly by taking the derivative of the quadratic form Eq. 8, and is given as $$\hat{x}_\alpha = [M^TM + \alpha L^TL]^{-1}My \quad \text{(Eq. 9)}$$

Since spectrum cannot be negative, non-negative constraints can be imposed on the solution $\hat{x}_\alpha$. We propose to use the non-negative least square (NNLS) algorithm shown in C. L. Lawson and R. J. Hanson, *Solving Least Squares Problems*, SIAM, 1995, incorporated by reference in its entirety for its teaching of the NNLS algorithm, for solving the regularization problem. With the non-negative constraints, solutions with less error are expected at the cost of computational complexity. If computing power is not readily available, the pseudo inverse can be used to solve the regularized solution. In alternate embodiments, the regularized solution may be calculated by various methods of solving system equations with tolerance including but not limited to the Moore-Penrose pseudoinverse, Gaussian elimination, and non negative least squares.

Regularization Parameter Selection

The regularized solution depends on both the noise level and on the regularization parameter ($\alpha$ in Tikhonov regularization and k in TSVD). For very large values of $\alpha$, or small values of k, the error due to regularization will be dominant. For very small values of $\alpha$ or large values of k, the error due to noise in the data will be dominant. There is an optimal value of $\alpha$ or k which balances these effects.

Generally, narrow band light spectrum requires less regularization and broad band light spectra require more regularization to be enforced. It would be useful to adaptively change the enforced regularization of the solution based on the input. Regularization parameter selection methods allow us to adaptively change the regularization parameter based on the input, thereby changing the smoothness of the solution. To choose an optimal regularization parameter, we may rely on L-curve method, or the Generalized-Cross-Validation (GCV) method. We introduce the L-curve method and GCV method, summarized from R. C. Aster, B. Borchers, and C. H. Thurber, *Parameter Estimation and Inverse Problems*, Elsevier Academic Press, 2005, incorporated by reference in its entirety for its teaching of the L-curve method and GCV method.

When plotted on a log-log scale, the curve of optimal values of $\|x\|_2$ versus $\|Mx-y\|_2$ often takes on a characteristic L shape. This happens because $\|x\mu_2$ is a strictly decreasing function of $\alpha$ and $\|Mx-y\|_2$ is a strictly increasing function of $\alpha$. The sharpness of the "corner" varies from problem to problem, but it is frequently well-defined. For this reason, the curve is called an L-curve. L-curve criterion select the value of $\alpha$ that gives the solution closest to the corner of the L-curve.

GCV is an alternative method for selecting a regularization parameter $\alpha$. In ordinary or "leave-one-out" cross validation, we consider the models that are obtained by leaving one of the m data points out of the fitting process. Consider the modified Tikhonov regularization problem in which we ignore a data point $d_k$, $$\min \sum_{i \neq k} ((Mx)_i - y_i)^2 + \alpha^2 \|Lx\|_2^2$$

Call the solution to this problem $x_{\alpha, L}^{[k]}$, where the superscript indicates that $d_k$ was left out of the computation. In the leave-one-out approach, we select the regularization parameter $\alpha$ so as to minimize the predictive errors for all k, $$\min V(\alpha) = \frac{1}{m} \sum_{k=1}^{m} \left( (Mx_{\alpha,L}^{[k]})_k - d_k \right)^2$$

As pointed out in literatures R. C. Aster, B. Borchers, and C. H. Thurber, *Parameter Estimation and Inverse Problems*, Elsevier Academic Press, 2005, for GCV, it can be shown that under some delicate assumptions regarding the noise and smoothness of $x_{ture}$, the value of $\alpha$ that minimizes $v(\alpha)$ approaches the value that minimizes $E[\|Mx_{\alpha, L} - y\|_2]$ (as well as $E[\|x_{ture} - x_{\alpha, L}\|_2] \to 0$) as the data points m goes to infinity. In practice, the size of the data set is fixed and the assumption regarding the properties of $x_{ture}$ and noise may not be valid, so the limit is not directly applicable. However, these results provide a theoretical justification for using the GCV method to select the Tikhonov regularization parameter.

Embodiment Method

Figure 3:
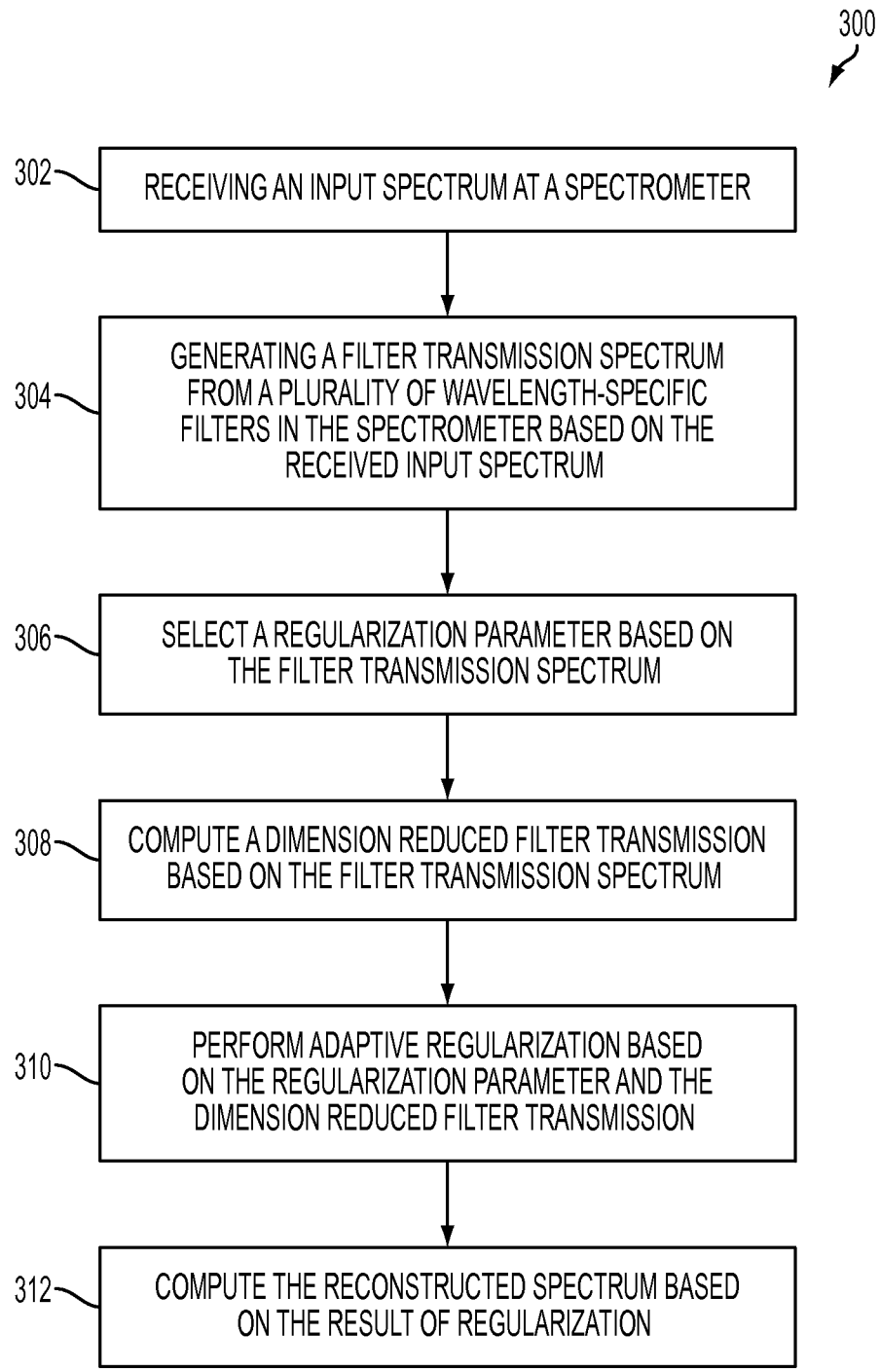
FIG. 3 is a process flow diagram of an embodiment method.

FIG. 3 illustrates an embodiment method 300 for reconstructing a spectrum. A spectrometer may receive an object or input spectrum 202 in step 302. The spectrometer may comprise a plurality of wavelength-specific filters. The spectrometer may be a miniature spectrometer, and the plurality of wavelength-specific filters may be a plurality of low resolution spectral filters. The plurality of wavelength-specific filters may generate a filter transmission spectrum 206 based on the received input spectrum in step 304. A regularization parameter may be selected based on the filter transmission spectrum in step 306. Selection of the regularization parameter may involve various methods, such as the L-curve method and GCV method discussed above. A dimension reduced filter transmission may be computed based on the filter transmission spectrum in step 308. Adaptive regularization may be performed based on the regularization parameter and the dimension reduced filter transmission in step 310. For example, this step may involve a Tikhonov regularization method or a Truncated Singular Value Decomposition method as discussed above. The reconstructed spectrum may be computed based on the result of regularization in step 312. Computing a reconstructed spectrum may involve various methods, such as the Moore-Penrose pseudoinverse, Gaussian elimination, or a non-negative least square method.

Further embodiments include spectrum reconstruction devices configured to perform similar methods. For example, embodiment devices may include computers including one or more processors or other logic devices configured to compute a reconstructed spectrum. This reconstructed spectrum may be computed based on a filter transmission spectrum received from a spectrometer comprising a plurality of wavelength-specific filters. The spectrum may be received in various forms, such as digital or analog signals transmitted wirelessly or via various connections. In further embodiments, spectrum reconstruction devices may be coupled with the spectrometer, may be part of the spectrometer, or may be informationally connected such that information may be exchanged with the spectrometer.

EXAMPLE

We disclose an example application of this spectrum reconstruction method, and experimental data obtained from this application. The experimental data presented in this example is meant to show the practicality of the method and aid those with common knowledge in the art in implementing this method.

Figure 4:
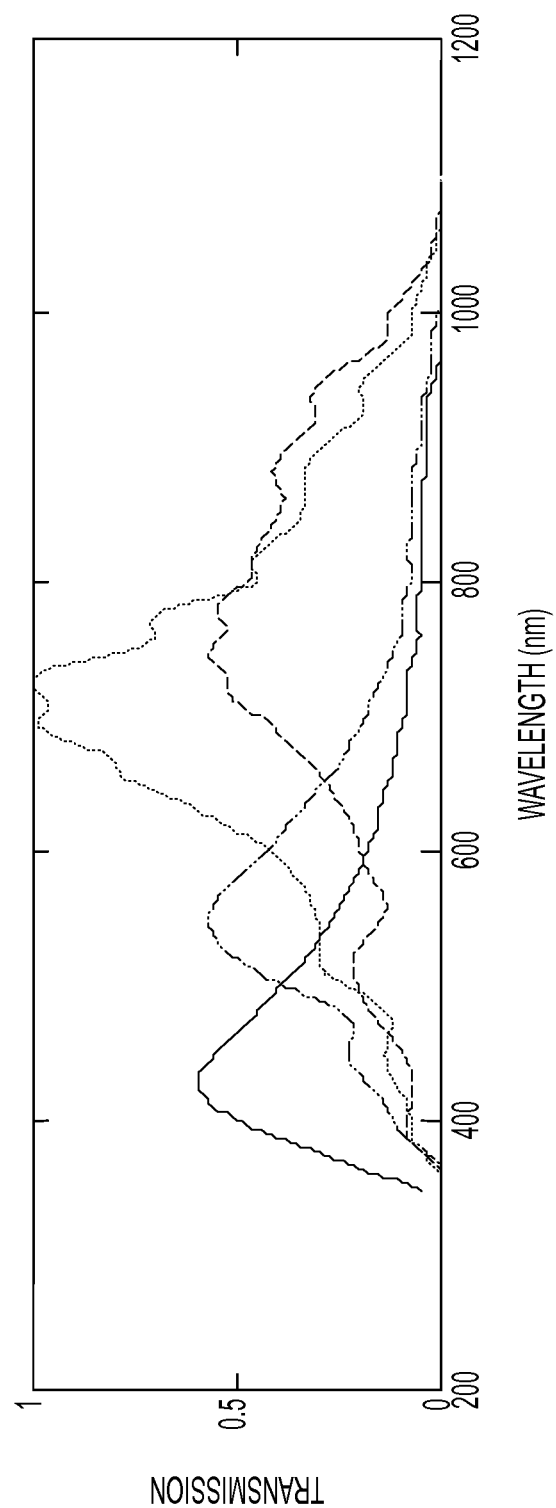
FIG. 4 is a spectral response function of low resolution spectral filters.

This spectrum reconstruction method was applied to a nano-optic filter array based miniature spectrometer. The transmission functions of filters contain multiple peaks, and long tails as illustrated by four of the filter responses shown in FIG. 4. The matrix M was measured by a monochromator system at 1 nm resolution. The transformation matrix s contains 70 Gaussian basis vectors with full width half maximum (FWHM) of 40 nm. They were spaced 10 nm apart over 360 nm to 1050 nm. Thus, MS is a 195 by 70 matrix with a condition number of $3 \times 10^{10}$.

There were 20 light inputs used as test cases. Half of the test cases were LED's of different colors, and the other half was a tungsten halogen light source filtered through different colored plastic. The LED light sources are narrow band sources and require less smoothing, the halogen light sources are broader and require more smoothing. Presented below are the methods tested for this experiment and the corresponding error was measured in the squared norm given by $e = \|x_{true} - \hat{x}\|_2^2$.

Methods Tested:

Unregularized: Solve Eq. (3) by using NNLS algorithm without any regularization, i.e., fix $\alpha=0$.

Tikhonov adaptive L-curve: Use Tikhonov regularization, and adaptively change the Tikhonov parameter using the L-curve criterion. This is one variation of the proposed spectrum reconstruction method.

Tikhonov adaptive GCV: Use Tikhonov regularization, and adaptively change the Tikhonov parameter using the GCV criterion. This is another variation of the proposed spectrum reconstruction method.

Optimized Tikhonov regularization with a fixed Tikhonov parameter: The Tikhonov parameter was determined by brute-force exhaustive-search to give the lowest average estimation error among all the test cases. This method is not practical, since we give it a priori knowledge of the input spectrum. But we can use this method to evaluate the lower bound limit on the estimation error of Tikhonov regularization without adaptive regularization.

Tikhonov regularization with optimized Tikhonov parameters for individual test cases: The optimal Tikhonov parameter for each spectrum was determined by brute-force exhaustive-search to give the lowest estimation error for each of the test case. This method provides a lower bound limit on how well adaptive regularization will do in terms of estimation error. This method is also not practical, because we give it a priori knowledge of the input spectrum. We will simply use this method to evaluate how well the GCV and L curve methods do in comparison.

FIG. 5 shows errors for each method under the zeroth order regularization and the non-negative constraint. The first column shows the mean error for all test cases. The second column shows the error only for the test cases with narrow band spectrum. The third column shows the error only for the test cases with broad band spectrum. For the unregularized solution, we note that the error for the narrow band spectrum is significantly lower than the error for the broad band input. The reason is that the optimal regularization parameter for the narrow band input is almost zero. So for narrow band spectra, the unregularized solution is sufficient. The broad band spectrum requires some regularization however, and all regularization methods give lower error for the broad band spectrum.

Figure 6A:
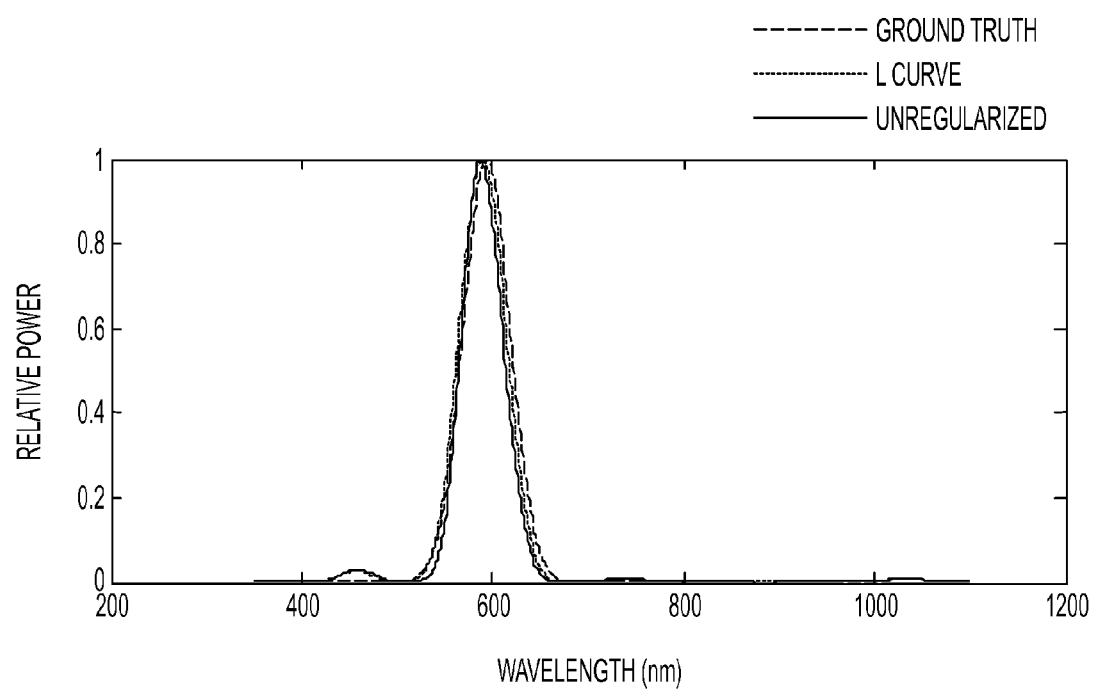
FIG. 6A is a graph of results obtained from an example application. An embodiment spectrum reconstruction method is compared against an unregularized spectrum reconstruction method for a narrow band spectrum.
Figure 6B:
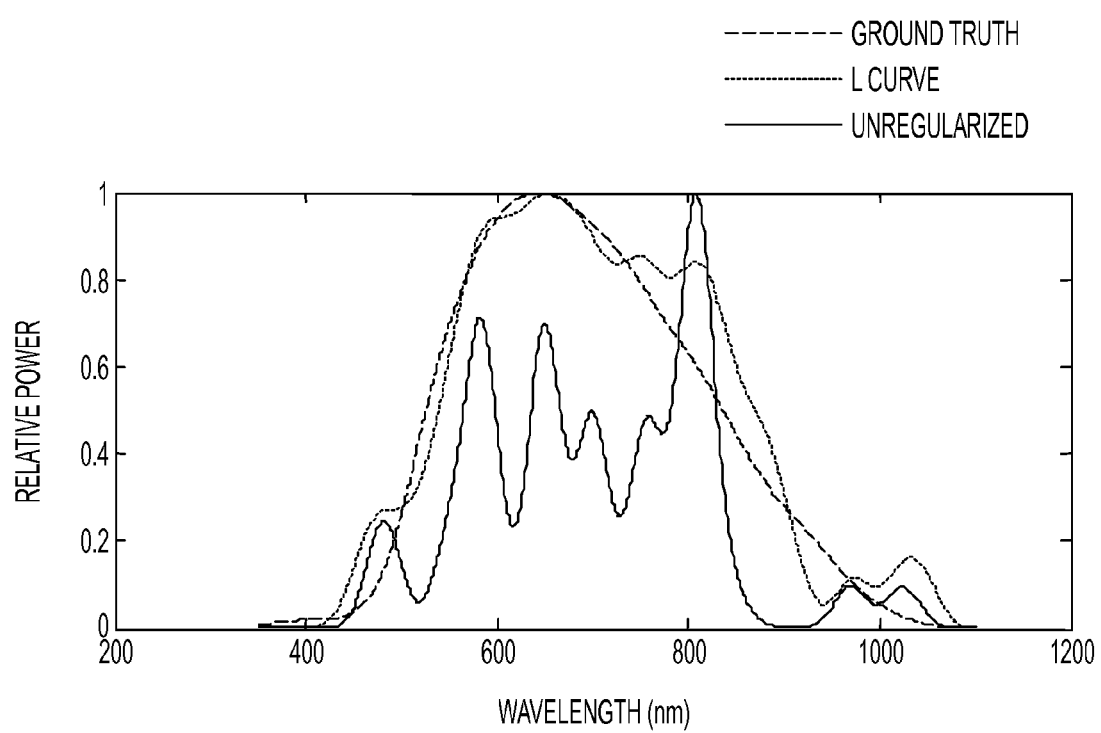
FIG. 6B is a graph of results obtained from an example application. An embodiment spectrum reconstruction method is compared against an unregularized spectrum reconstruction method for a broad band spectrum.

An example of the comparison between the regularized and unregularized spectrum reconstruction is shown in FIGS. 6A and 6B. FIG. 6A shows that for a narrow band input spectrum, the unregularized solution is almost equivalent to the Tikhonov adaptive L-curve solution. FIG. 6B shows that for a broad band input spectrum, the Tikhonov adaptive L-curve solution gives a superior estimation than the unregularized solution. Furthermore, changing the regularization value individually provides better results than if the regularization value was fixed. This is also made clear by observing that Method 5 has lower error than Method 4 in every respect.

Figure 6C:
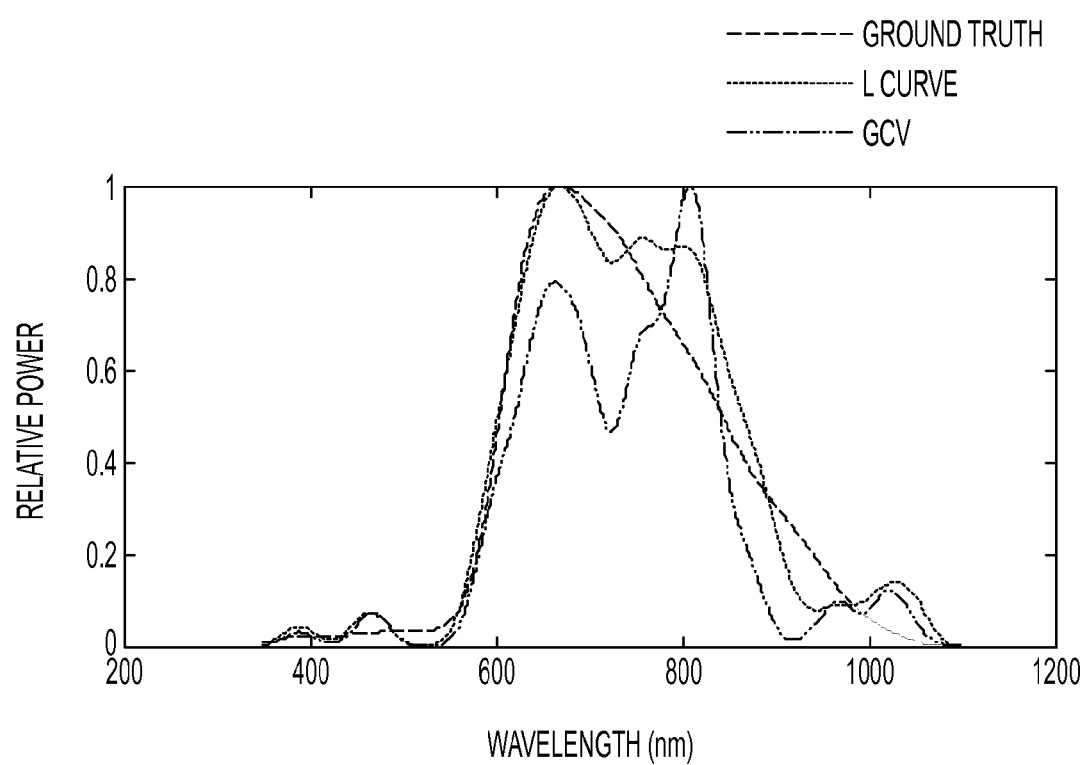
FIG. 6C is a graph of results obtained from an example application. An embodiment spectrum reconstruction method using Generalized Cross Validation is compared against a spectrum reconstruction method using L-curve.

For the adaptive regularization methods in this example, the L-curve method performed better than the GCV method. The GCV method had a tendency to under regularize the solution for the broad band inputs, as seen in FIG. 6C. As a result, the average error of the GCV method is not better than the L-curve method. The error of the L-curve method is 78% lower than the unregularized solution and 17% lower than the optimized Tikhonov regularization with a fixed regularization parameter. When the optimal regularization parameter is individually selected as in Method 5, the optimal method delivers an error 1.13 lower than the L-curve method. Therefore, we consider that Tikhonov regularization with L-curve is a satisfactory adaptive algorithm for spectrum reconstruction in this example.

Additional data for first order and second order Tikhonov regularization are presented in the table on FIG. 7. The GCV method, instead, outperforms the L-curve method for the first and second order regularization. We note that the best deliverable results from the first order and second order regularization are no better than the zeroth order regularization. It should be also noticed that the non-negative constraints improve the results significantly for all methods.

Finally, it should be noticed that the imperfect spectrum reconstruction illustrated in our experiment here is caused by the unknown noise or error encountered in the system transfer matrix M, due to a measurement limitation, as well as the unknown system noise n. Near ideal reconstruction can be obtained if the errors and noise are absent.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

What is claimed is:

1. A method for operating a filter-array-based spectrometer, comprising:
   providing a filter-array-based spectrometer comprising a filter array that includes a plurality of wavelength-specific filters, each wavelength-specific filter being a low resolution spectral filter and providing different filtering characteristics, and at least one of the lower resolution spectral filters providing multiple peaks in transmission and long tails spanning an entire visible light region;
   providing a same input spectrum to the filter array to cause the plurality of wavelength-specific filters to generate a plurality of sensor outputs, each sensor output corresponding to an integral over wavelength of a product of the same input spectrum as a function of wavelength and transmittance of a respective wavelength-specific filter, each sensor output corresponding to a respective filter transmission spectrum;
   selecting a regularization parameter based on the filter transmission spectra generated as the plurality of sensor outputs;
   computing a dimension reduced filter transmission based on the filter transmission spectra;
   performing adaptive regularization based on the regularization parameter and the dimension reduced filter transmission; and
   computing a reconstructed spectrum that estimates the input spectrum provided to each of the plurality of wavelength-specific filters based on the result of regularization using a processor.

2. The method of claim 1, wherein selecting the regularization parameter comprises using an L-Curve method.

3. The method of claim 1, wherein selecting the regularization parameter comprises using a General Cross Validation method.

4. The method of claim 1, wherein performing adaptive regularization comprises using a Tikhonov regularization method.

5. The method of claim 1, wherein performing adaptive regularization comprises using a Truncated Singular Value Decomposition method.

6. The method of claim 1, wherein computing the reconstructed spectrum comprises using a Moore-Penrose pseudoinverse, Gaussian elimination, or non-negative least square method.

7. The method of claim 1, wherein the spectrometer is a miniature spectrometer and the plurality of wavelength-specific filters is a plurality of low resolution spectral filters.

8. A filter-array-based spectrometer comprising:
   a filter array comprising a plurality of wavelength-specific filters configured to receive a same input spectrum and to generate a plurality of sensor outputs, each wavelength-specific filter being a low resolution spectral filter and providing different filtering characteristics, and at least one of the lower resolution spectral filters providing multiple peaks in transmission and long tails spanning an entire visible light region, each sensor output corresponding to an integral over wavelength of a product of the same input spectrum as a function of wavelength and transmittance of a respective wavelength-specific filter, each sensor output corresponding to a filter transmission spectrum of a respective wavelength-specific filter; and
   a spectrum reconstruction device comprising a processor configured to receive the filter transmission spectra from the wavelength-specific filters and configured with processor-executable instructions to compute a reconstructed spectrum using adaptive regularization based on the filter transmission spectra.

9. The filter-array-based spectrometer of claim 8, wherein each of the plurality of wavelength-specific filters is configured to receive a same input spectrum and each of the plurality of wavelength-specific filters is configured to generate a respective filter transmission spectrum based on the received input spectrum.

10. The filter-array-based spectrometer of claim 8, wherein the processor is configured with processor-executable instructions to perform operations comprising:
    selecting a regularization parameter based on the filter transmission spectrum;
    computing a dimension reduced filter transmission based on the filter transmission spectrum; and
    performing adaptive regularization based on the regularization parameter and the dimension reduced filter transmission; and
    computing the reconstructed spectrum based on the result of regularization.

11. The filter-array-based spectrometer of claim 10, wherein the processor is further configured such that selecting the regularization parameter comprises using an L-Curve method.

12. The filter-array-based spectrometer of claim 10, wherein the processor is further configured such that selecting the regularization parameter comprises using a General Cross Validation method.

13. The filter-array-based spectrometer of claim 10, wherein the processor is further configured such that performing adaptive regularization comprises using a Tikhonov regularization method.

14. The filter-array-based spectrometer of claim 10, wherein the processor is further configured such that performing adaptive regularization comprises using a Truncated Singular Value Decomposition method.

15. The filter-array-based spectrometer of claim 10, wherein the processor is further configured such that computing the reconstructed spectrum comprises using a Moore-Penrose pseudoinverse, Gaussian elimination, or non-negative least square method.

16. The filter-array-based spectrometer of claim 9, wherein the spectrometer is a miniature spectrometer and the plurality of wavelength-specific filters is a plurality of low resolution spectral filters.

17. The filter-array-based spectrometer of claim 9, wherein the processor is part of a computer.

18. The filter-array-based spectrometer of claim 8, wherein each of the plurality of wavelength-specific filters is configured to generate a plurality of sensor outputs, each sensor output corresponding to an integral over wavelength of a product of the same input spectrum as a function of wavelength and transmittance of a respective wavelength-specific filter, and each sensor output corresponding to a filter transmission spectrum of a respective wavelength-specific filter.

19. The filter-array-based spectrometer of claim 8, wherein each wavelength-specific filter provides different filtering characteristics.

* * * * *